UNITED STATES PATENT OFFICE.

SAMUEL HEMAN THURSTON, OF LONGBRANCH, NEW JERSEY.

PROCESS OF COATING ONE METAL WITH ANOTHER METAL.

SPECIFICATION forming part of Letters Patent No. 706,702, dated August 12, 1902.

Application filed December 24, 1901. Serial No. 87,079. (No specimens.)

*To all whom it may concern:*

Be it known that I, SAMUEL HEMAN THURSTON, a citizen of the United States, and a resident of Longbranch, in the county of Monmouth and State of New Jersey, have invented certain new and useful Improvements in Processes of Coating One Metal with Another Metal, of which the following is a specification.

My invention relates to processes of coating one metal with another metal by impacting one against the other, thereby producing an amorphous, adherent, inherent, coherent, and permanent film or particle of one metal upon another metal, the particles of the coating metal being driven into and incorporated with the metal being coated by beating or impacting them into the interstices or pores at and beneath the surface thereof, as hereinafter specified; and it consists in certain methods of procedure fully specified and claimed herein.

In previous applications to which this one is closely related and upon which this is an improvement I have described and claimed the coating of one metal with another by impact, producing an amorphous, permanent, inherent, and coherent metallic coating, and also a coating of the oxid of the said metal upon the metal being coated which differs in some essential points from my present invention.

In order that persons skilled in the art to which my invention appertains may understand and practice my invention, I will proceed to describe it.

The first step in my process consists in heating the metal to be coated sufficiently to open up the pores and loosen any scale or oxidation which may cling to the metal to be coated and also to prepare the surface for the next step, which consists in beating upon the metal being coated rapidly with beaters composed of the coating metal, (in a manner similar to that described in my United States Patent No. 661,650, issued November 13, 1900,) the first effect of which is to beat off any scale which adheres and to clean the surface of the metal being coated, and then the coating metal from the beaters is beaten onto the surface into the opened pores and beneath the surface thereof more deeply, quicker, and with less disturbance of the cleaned metal. This operation forms a more compact and smooth coating than by my former process, herein referred to. By heating the metal to be coated previous to beating it the use of acids and alkalies to clean the metal is avoided, and a better product is the result. It is also cheaper.

In the case of coppering iron and steel the heating of the metal to be coated causes a heat in the copper coating, and an oxidation occurs which is strongly adherent and permanent, practically unaffected by acids and alkalies, and a valuable product results.

Having now fully described my invention and the manner in which I have disclosed it, what I claim as new and as my invention, and desire to secure by Letters Patent, is—

The within-described process of coating one metal upon another with an amphorous inherent, adherent, coherent, permanent film or particle of the coating metal, which consists in artificially heating the metal to be coated and then impacting the particles of the coating metal into the pores of the metal being coated, by beating them, substantially and for the purposes hereinbefore specified.

Signed at Newark, in the county of Essex and State of New Jersey, this 23d day of November, A. D. 1901.

SAMUEL HEMAN THURSTON.

Witnesses:
GEO. O. TOTTEN,
HARRY TEMPLETON.